(12) United States Patent
Padilla et al.

(10) Patent No.: US 7,755,825 B1
(45) Date of Patent: Jul. 13, 2010

(54) METHOD OF FABRICATING AN OPTICAL MODULATOR

(75) Inventors: Rudy S. Padilla, San Diego, CA (US); Michael G. Lovern, Chula Vista, CA (US); Stephen D. Russell, San Diego, CA (US); Randy L. Shimabukuro, Kapolei, HI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 596 days.

(21) Appl. No.: 11/762,166

(22) Filed: Jun. 13, 2007

Related U.S. Application Data

(62) Division of application No. 10/758,721, filed on Jan. 16, 2004, now Pat. No. 7,268,930.

(51) Int. Cl.
  *G02B 26/00* (2006.01)
  *C23F 1/00* (2006.01)
(52) U.S. Cl. .......................... 359/237; 359/900; 216/2
(58) Field of Classification Search ................ 359/237, 359/900; 216/2
  See application file for complete search history.

(56) References Cited

U.S. PATENT DOCUMENTS

| 6,122,091 | A | 9/2000 | Russell et al. |
| 6,166,478 | A | 12/2000 | Yi et al. |
| 6,310,725 | B1 | 10/2001 | Duine et al. |
| 6,327,069 | B1 | 12/2001 | Allemand et al. |
| 6,329,103 | B1 | 12/2001 | Ishiko et al. |
| 6,337,624 | B1 | 1/2002 | Nakaho et al. |
| 6,543,087 | B2 | 4/2003 | Yeh et al. |

OTHER PUBLICATIONS

Chu et al., "Optical Communication Using Micro Corner Cube Reflectors," 10th IEEE International Workshop on Micro Electro Mechanical Systems, pp. 1-6 (1997).

*Primary Examiner*—Jack Dinh
(74) *Attorney, Agent, or Firm*—Kyle Eppele; J. Eric Anderson

(57) ABSTRACT

A method of fabricating an optical modulator on a silicon substrate, comprising: forming a silicon nitride layer on the silicon substrate; forming a first polycrystalline silicon layer (PSL) on the silicon nitride layer; patterning the first PSL; forming a first silicon dioxide layer (SDL) on the first patterned PSL; patterning the first SDL; forming a second PSL on the first patterned SDL; patterning the second PSL; forming a second SDL on the second patterned PSL; patterning the second SDL; forming a third PSL on the second patterned SDL; patterning the third PSL; forming a metal layer on the third patterned PSL; patterning the metal layer; removing the first and second SDLs to effect release of first and second side reflectors; forming an active layer on the metal layer; and patterning the active layer or stack to form a base reflector and associated conductive traces for biasing.

16 Claims, 11 Drawing Sheets

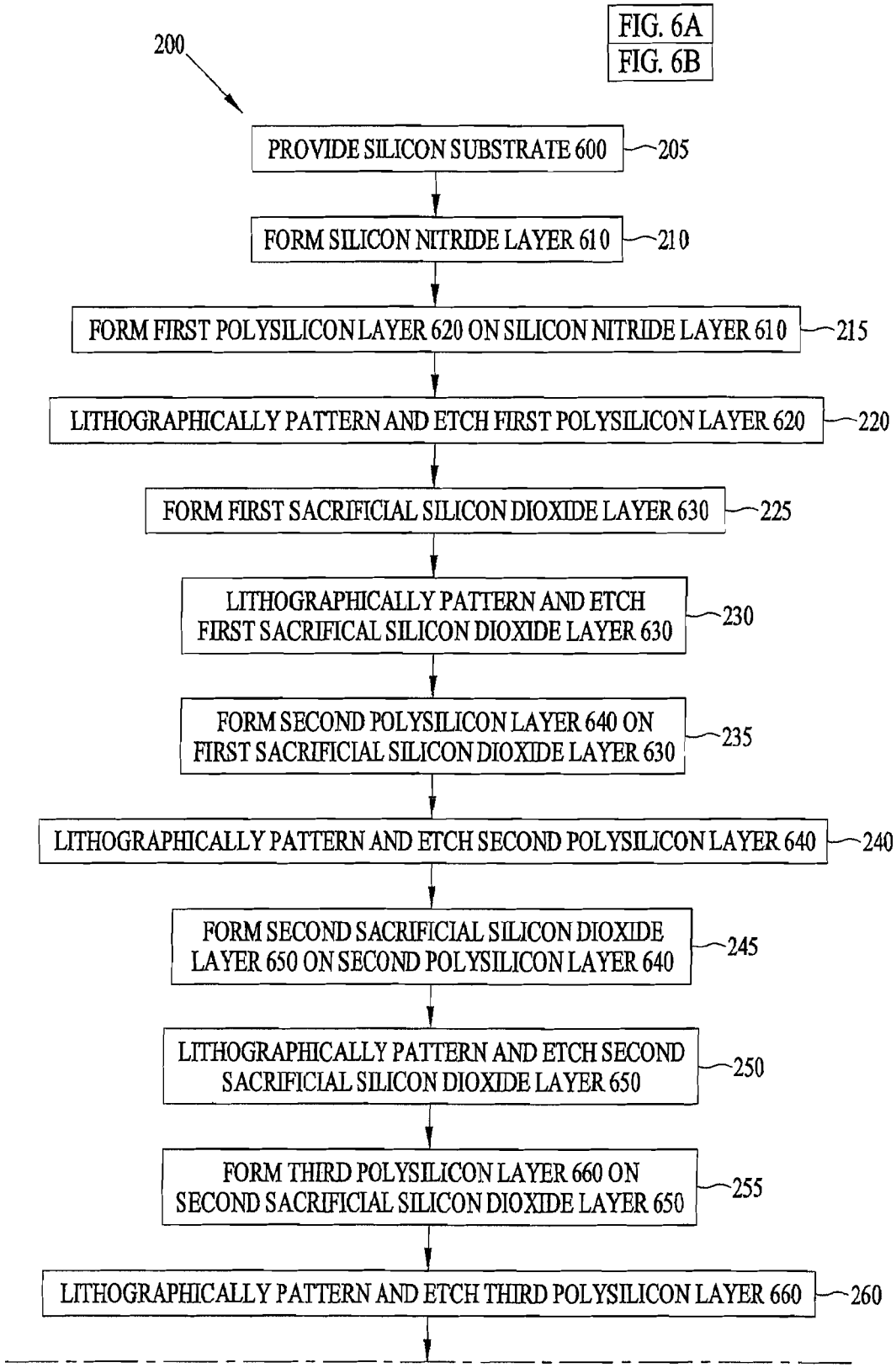

METHOD OF FABRICATING AN OPTICAL MODULATOR

CROSS-REFERENCE TO RELATED APPLICATION

This application is a divisional application of U.S. patent application Ser. No. 10/758,721 (NC#83928), filed 16 Jan. 2004, titled "Optical Modulator," pending, which is incorporated herein by this reference.

STATEMENT OF GOVERNMENT INTEREST

The invention described herein may be manufactured and used by or for the Government of the United States of America for Governmental purpose without the payment of any royalties thereon or therefore.

FEDERALLY-SPONSORED RESEARCH AND DEVELOPMENT

This invention (Navy Case No. 98777) was developed with funds from the United States Department of the Navy. Licensing inquiries may be directed to Office of Research and Technical Applications, Space and Naval Warfare Systems Center, San Diego, Code 2112, San Diego, Calif., 92152; telephone (619)553-2778; email: T2@spawar.navy.mil.

BACKGROUND OF THE INVENTION

The typical corner cube reflector 10, as shown in FIG. 1, comprises three mutually orthogonal plano-reflective surfaces 11, 12, and 13, which cumulatively form a right-angle concave mirror. An incident light ray upon the corner cube reflector 10 from direction A will be reflected back in direction A, i.e., toward the source, if it reflects off the three plano-reflective surfaces 11, 12, and 13. Corner cube reflectors 20 with a movable base mirror 24, as shown in FIG. 2, show promise as optical modulators. However, achieving proper alignment and planarity of the base mirror 24 during the fabrication process has proved challenging. Furthermore, microelectromechanical systems (MEMS) require hermetic packaging to avoid stiction and other reliability problems. There is a need for improved structures that simplify fabrication, avoid operational problems, mitigate packaging constraints, and improve reliability.

BRIEF DESCRIPTION OF THE DRAWINGS

For a more complete understanding of the optical modulator, reference is now made to the following detailed description of the embodiments as illustrated in the accompanying drawings.

FIGS. 6A and 6B provide a schematic description of the fabrication process of the optical modulator.

DESCRIPTION OF THE EMBODIMENTS

Figure 1:
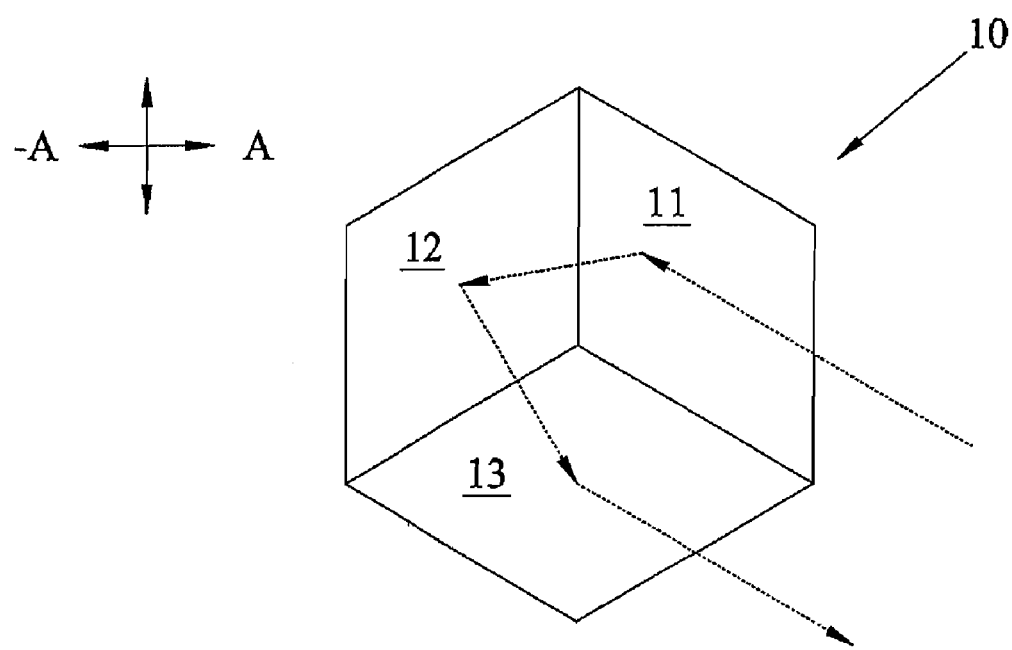
FIG. 1 is a schematic of a corner cube reflector of the prior art.
Figure 2:
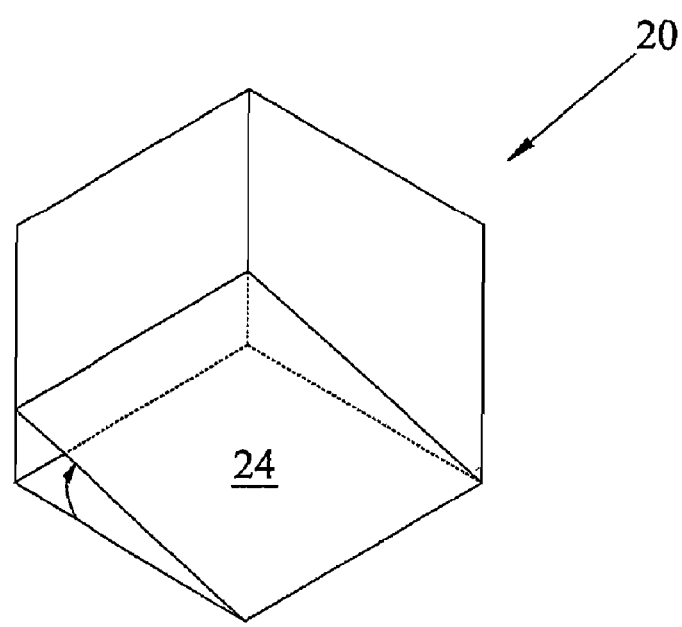
FIG. 2 is a schematic of a corner cube reflector of the prior art with a movable base mirror.
Figure 3:
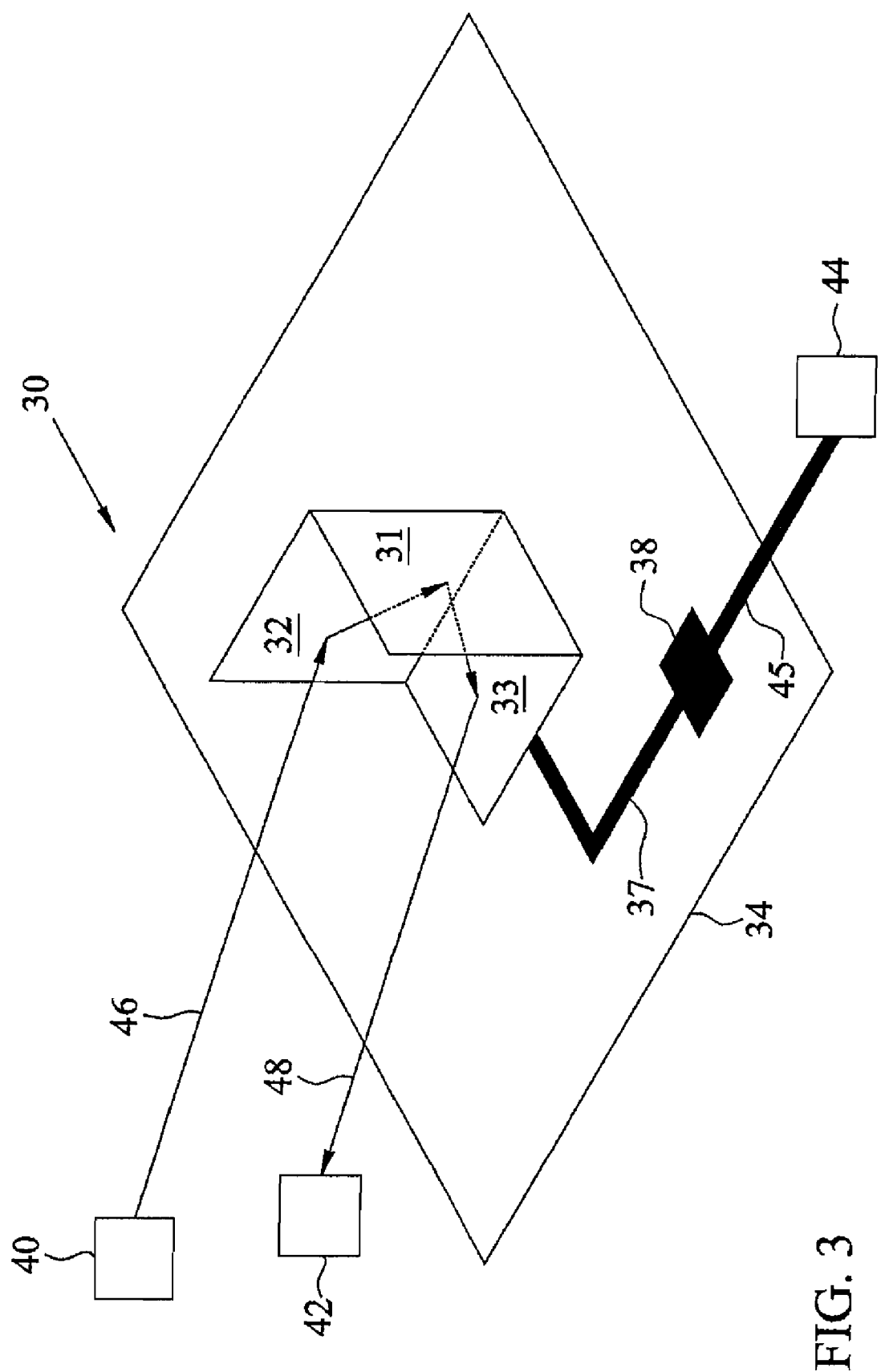
FIG. 3 is a schematic of the optical modulator of the present invention.

FIG. 3 schematically shows optical modulator 30 used for optically modulating electromagnetic energy. Optical modulator 30 comprises three substantially planar reflective components 31, 32, and 33 arranged so that they are substantially mutually orthogonal to each other. Base reflector 33 lies substantially in the plane of substrate 34. First and second side reflectors 31 and 32 are fabricated substantially in the plane of substrate 34 and repositioned for operation mutually orthogonal to themselves and substrate 34 at a later stage of the fabrication process. A beam of incident electromagnetic energy 46 from source 40 is depicted reflecting from optical modulator 30 following reflection off each of the three substantially planar reflective components 31, 32, and 33. Reflected beam of modulated electromagnetic energy 48 is depicted as returning in the direction of source 40 and collected by detector 42. Optical modulator 30 also comprises an electrically conductive pad 38 and electrically conductive trace 37 operatively connected to base reflector 33, by which a voltage may be applied to base reflector 33. Base reflector 33 contains at least one layer by which its reflection properties may be altered or modulated with an applied voltage, thereby modulating electromagnetic energy 46. Biasing source 44 may be operatively coupled by a suitable means 45 to provide a modulated voltage to electrically conductive pad 38. In one embodiment, biasing source 44 is a sensor, thereby providing a modulated signal at detector 42, representative of the sensor output and its environmental characteristics. Biasing source 44 may be monolithically integrated onto substrate 34 or positioned remotely as required for the particular application. Source 40 and detector 42 are normally configured a distance from optical modulator 30 to remotely interrogate optical modulator 30 with associated biasing source 44.

Figure 4:
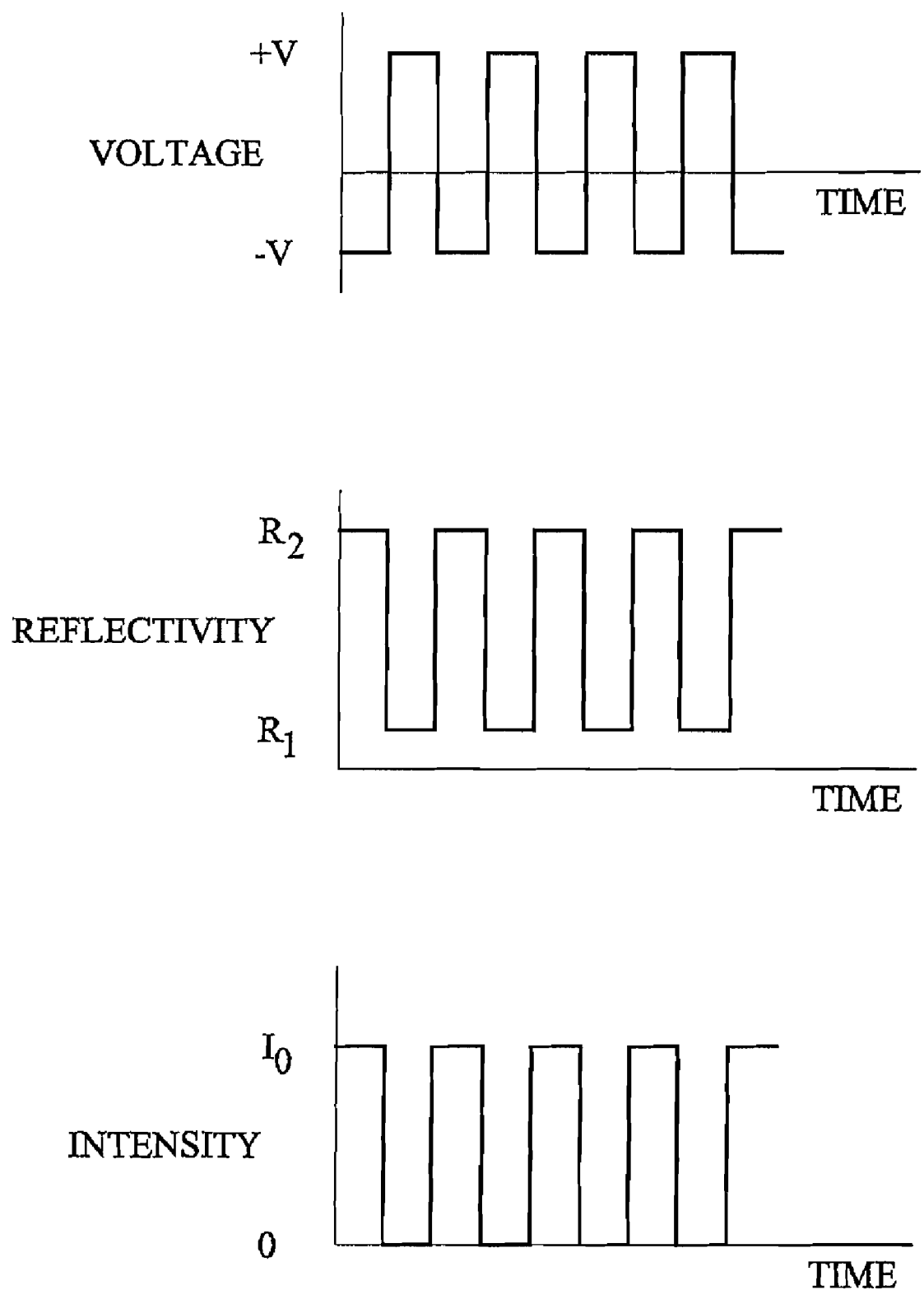
FIG. 4 shows the correlation between the biasing source voltage, reflectivity, and intensity of the electromagnetic radiation.

FIG. 4 schematically shows the correlation between activation of biasing source 44 (shown in FIG. 3) voltage between −V to +V and the corresponding change in reflectivity from R2 to R1, where R2 is greater than R1. In one embodiment, base reflector 33 of FIG. 3 contains an electrochromic stack whose reflectivity typically decreases with applied voltage. Typical electrochromic stacks are comprised of an ion storage layer such as lithium vanadium oxide, an ion conductive layer such as $Li_2O$—$CeO_2$–$SiO_2$ or $LiAlF_4$ and the like, and an electrochromic layer such as tungsten oxide ($WO_3$). These materials are well known in the art of advanced optical materials as described for example by Nakaho, et. al., in "Rear view mirror apparatus and method for controlling the same," U.S. Pat. No. 6,337,624; Ishiko, et. al., in "Solid electrolyte and method for producing it," U.S. Pat. No. 6,329,103; Allemand, et. al., in "Electrochromic devices with improved processability and methods of preparing the same," U.S. Pat. No. 6,327,069; Duine, et. al., in "Optical Switching device," U.S. Pat. No. 6,310,725; and the publications and patents cited therein. The corresponding change in reflectivity shown in FIG. 4 is thereby correlated with a change in the intensity of the modulated electromagnetic radiation 48 from a maximum level $I_0$ to a minimum level that can be designed to be zero.

In an alternate embodiment, base reflector 33 contains a plurality of layers, which form a capacitive structure that includes an electro-optic material. The electro-optic material changes its optical and dielectric properties with the application of a voltage. This can, in turn, change the reflective properties of the stacked structure. See, for example, U.S. Pat. No. 6,122,091, "Transmissive Surface Plasmon Light Valve," by Russell, et. al. Additional components may be ascribed to these embodiments to meet particular applications, some of which are described in the embodiments below.

Figure 5:
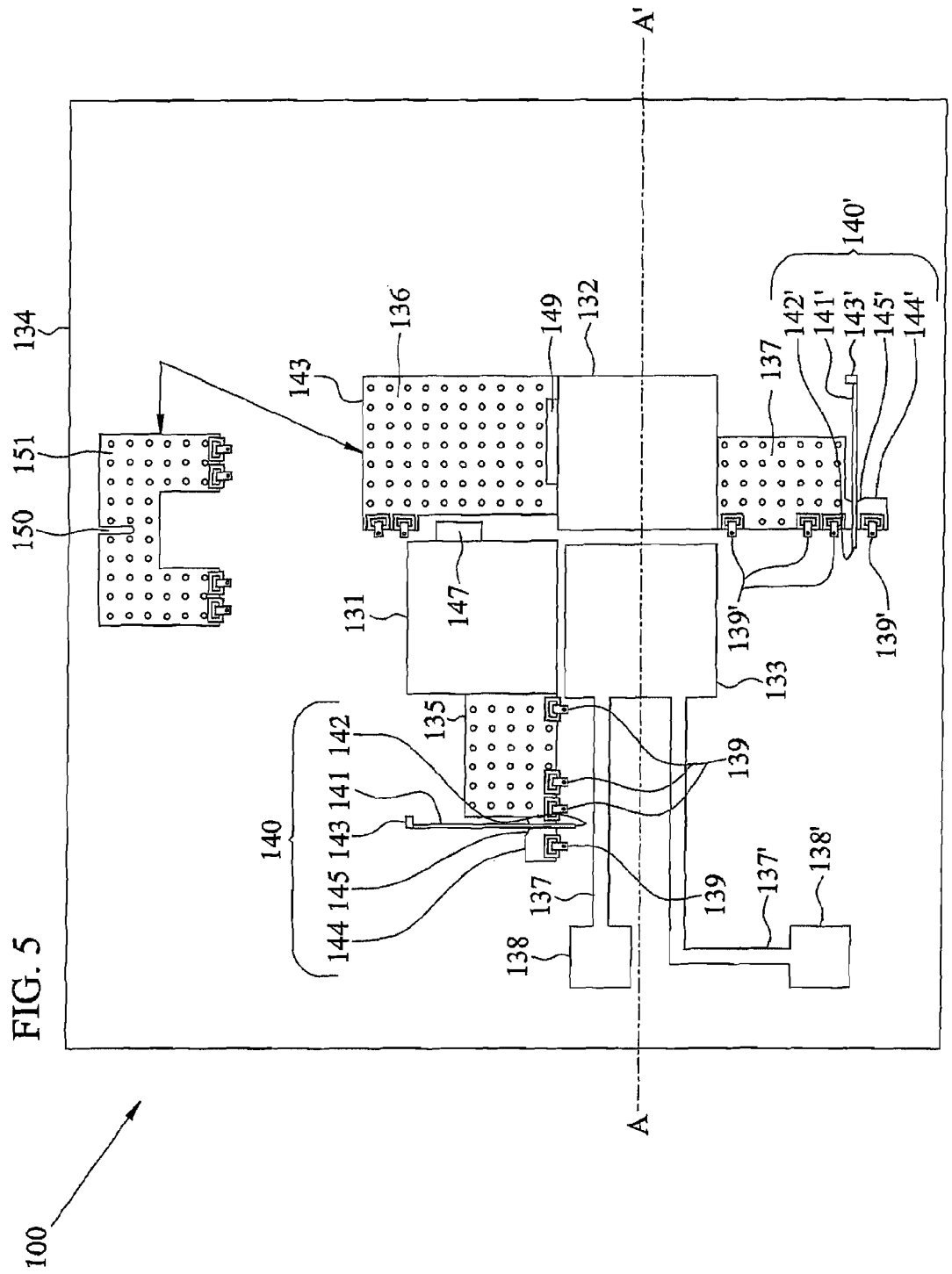
FIG. 5 shows a two-dimensional layout of the optical modulator prior to assembly.

FIG. 5 shows a two-dimensional layout of optical modulator 100 prior to assembly. Formed on substrate 134 are three substantially planar reflective components 131, 132, and 133. Base reflector 133 lies substantially in the plane of substrate 134. First and second side reflectors 131 and 132 are fabricated substantially in the plane of substrate 134 and repositioned for operation mutually orthogonal to themselves and substrate 134 at a later stage of the fabrication process. First side reflector 131 comprises first structural member 135, first locking hinge 140, micro-hinges 139, and tenon 147. First locking hinge 140 further comprises a rod 141 with first end 142 and second end 143 and a first mini-locking plate 144 with first groove 145. Second side reflector 132 comprises second and third structural members 136 and 137, second locking hinge 140', micro-hinges 139', and mortise 149. Second locking hinge 140' further comprises a second rod 141' with first end 142' and second end 143' and a second mini-locking plate 144' with second groove 145'. Optical modulator 100 also comprises a locking plate 151 containing slot 150 fabricated substantially in the plane of substrate 134 and repositioned adjoining edge 143 of structural member 136 at a later stage of the fabrication process. Electrically conductive pads 138 and 138' and electrically conductive traces 137 and 137' are operatively coupled to the active layer or stack on base reflector 133 by which a voltage may be applied to change the reflective properties of base reflector 133. The biasing source and associated electronics that may be monolithically integrated are not shown for simplicity.

Figure 6B:
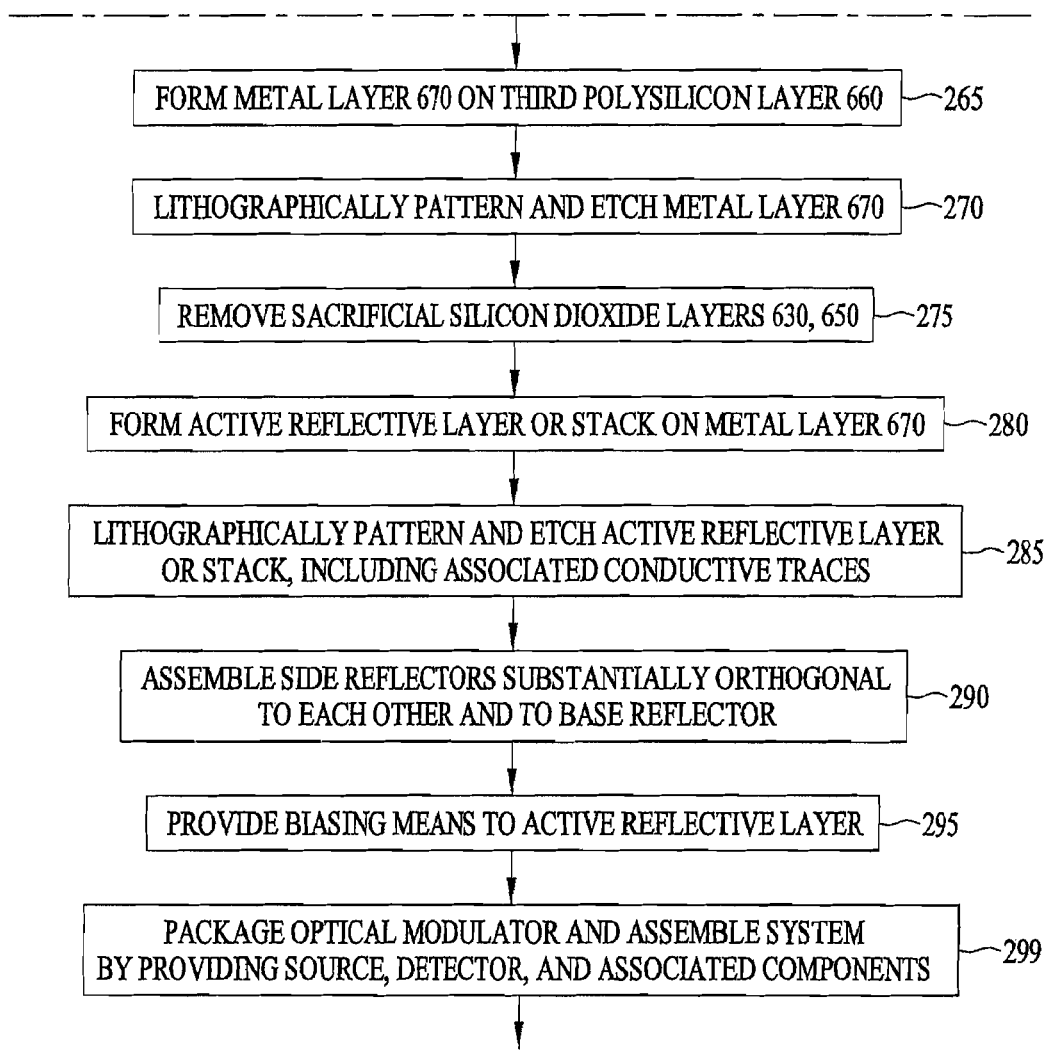

FIGS. 6A and 6B schematically describe the fabrication process 200 of the optical modulator. The steps include step 205, providing silicon substrate 600, and step 210, forming silicon nitride layer 610 on substrate 600. Silicon nitride layer 610 is preferably formed by decomposition of ammonia and dichlorosilane at an elevated temperature to form a deposited layer about 0.6 µm thick. Next, first polycrystalline silicon layer (polysilicon) 620 is formed on silicon nitride layer 610 in step 215. First polycrystalline silicon layer 620 is preferably formed by decomposition of silane at an elevated temperature to form a deposited layer about 0.5 µm thick. Then, first polysilicon layer 620 is lithographically patterned and etched using techniques common to the art of microfabrication to form a patterned polysilicon layer in step 220. Next, first sacrificial silicon dioxide layer 630 is formed on first polysilicon layer 620 in step 225. First sacrificial silicon dioxide layer 630 may be formed by deposition to a thickness of about 2.0 µm. Then, first sacrificial silicon dioxide layer 630 is lithographically patterned and etched using techniques common to the art of microfabrication to form a patterned sacrificial silicon dioxide layer in step 230. Next, second polysilicon layer 640 is formed on first sacrificial silicon dioxide layer 630 in step 235. Second polysilicon layer 640 is preferably formed by deposition to form a layer about 2.0 µm thick. Then, second polysilicon layer 640 is lithographically patterned and etched using techniques common to the art of microfabrication to form a patterned second polysilicon layer in step 240. Next, second sacrificial silicon dioxide layer 650 is then formed on second polysilicon layer 640 in step 245. Second silicon dioxide layer 650 may be formed by deposition to a thickness of about 0.75 µm. Then, second sacrificial silicon dioxide layer 650 is lithographically patterned and etched using techniques common to the art of microfabrication to form a patterned second sacrificial silicon dioxide layer in step 250. Next, third polysilicon layer 660 is formed on second silicon dioxide layer 650 in step 255. Third polysilicon layer 660 is preferably formed by deposition to form a layer about 1.5 µm thick. Then, third polysilicon layer 660 is lithographically patterned and etched using techniques common to the art of microfabrication to form a patterned third polysilicon layer in step 260. Next, metal layer 670 is formed on third polysilicon layer 660 in step 265. Metal layer 670 is preferably formed by deposition to form a layer about 0.5 µm thick of a 99% aluminum—1% silicon alloy. Then, metal layer 670 is lithographically patterned and etched using techniques common to the art of microfabrication to form a patterned metal layer in step 270. Next, sacrificial silicon dioxide layers 630, 650 are removed in step 275. This is preferably done using a buffered hydrofluoric acid solution with subsequent $CO_2$ drying to effect release of the microstructures. Descriptions of related fabricated steps to the above sequence can be found in Koes ter, *Multi-User MEMS Process (MU'S) Design Handbook*, rev. 6, Cronos Integrated Microsystems, Research Triangle Park, NC 27709, 2001. Then, an active reflective layer or stack is formed on metal layer 670 in step 280. In one embodiment, step 280 includes the deposition of an ion storage layer, an ion conductive layer, and an electrochromic material as practiced in the art. In step 285, the active reflective layer or stack is then patterned to form a base reflector and associated conductive traces for biasing. The patterning of the stack may include either a single forming and patterning process or multiple forming and multiple patterning processes as required for the particular application. Steps 275 may be interchanged with steps 280 and 285, depending on the application. Following the above microfabrication steps, the modulator is further assembled in step 290 by positioning the released side reflectors substantially orthogonal to themselves and the base reflector. Referring again to FIG. 5, in this embodiment, the sequence for assembly includes rotation of first side reflector 131 and first structural member 135 orthogonal to substrate 134 about the axis formed by micro-hinges 139 and first locking hinge 140 until first locking hinge 140 affixes first side reflector 131, assuring orthogonality. As first side reflector 131 and first structural member 135 are rotated, the first end 142 of first locking hinge 140 lifts up over first mini-locking plate 144 until the first end 142 locks into first groove 145. Then, second side reflector 132 and second and third structural members 136 and 137 are rotated orthogonal to substrate 134 about the axis formed by micro-hinges 139' and locking hinge 140' until locking hinge 140' affixes second side reflector 132 and tenon 147 inserts into mortise 149, assuring mutual orthogonality. Locking plate 151 is then rotated to interlock edge 143 of second structural member 136 with slot 150 to assure structural rigidity. Referring back to FIG. 6B, a biasing means is provided and operatively coupled to the active reflective layer in step 295. In the preferred embodiment, this is a monolithically fabricated microsensor, but may include an independently fabricated microsensor operatively coupled to the active reflective layer or stack. Types of microsensors include, but are not limited to, chemical sensors, biological sensors, vibration sensors, radiological sensors, temperature sensors, photonic sensors, acoustic sensors, magnetic sensors, electromagnetic sensors, ionization sensors, humidity sensors, pH sensors and the like. Finally, the optical modulator is appropriately packaged and assembled into a system by providing a source of electromagnetic energy, a detector for the reflected energy, and associated optical, electrical, and power sources to enable operation in step 299.

Figure 7A:
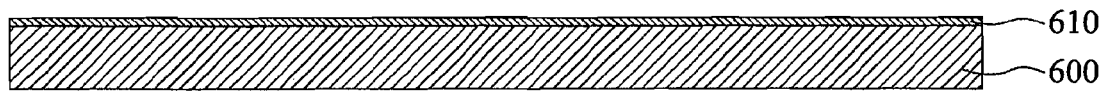
FIGS. 7A to 7G are cross-sectional views of the optical modulator.
Figure 7B:
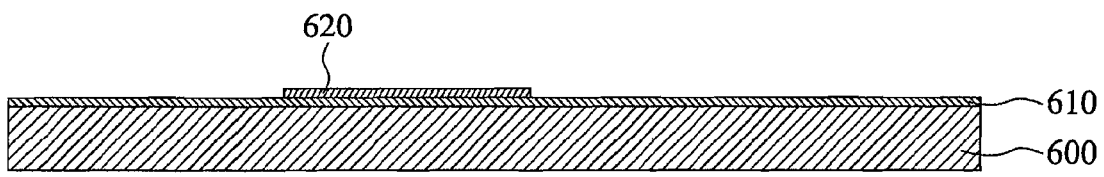
Figure 7C:
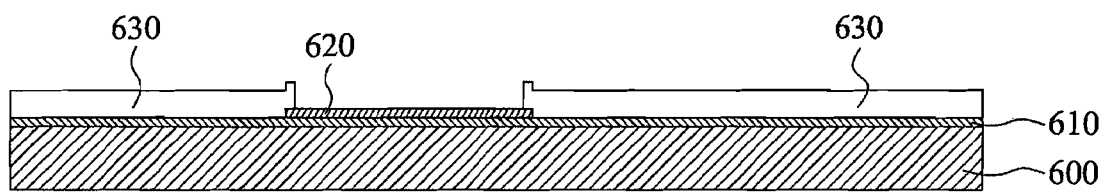
Figure 7D:
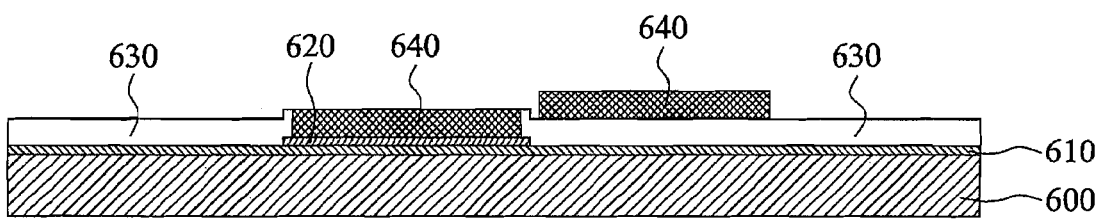
Figure 7E:
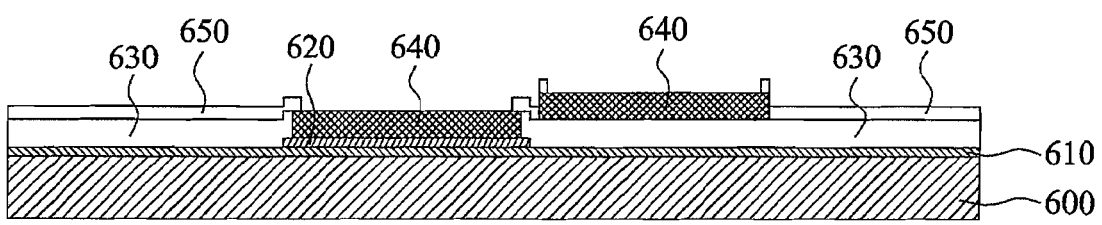
Figure 7F:
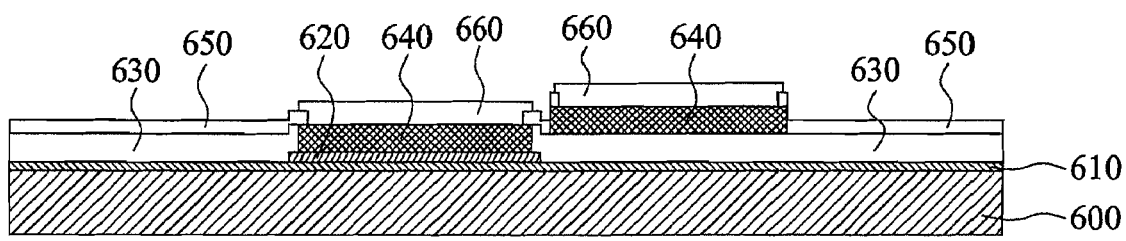
Figure 7G:
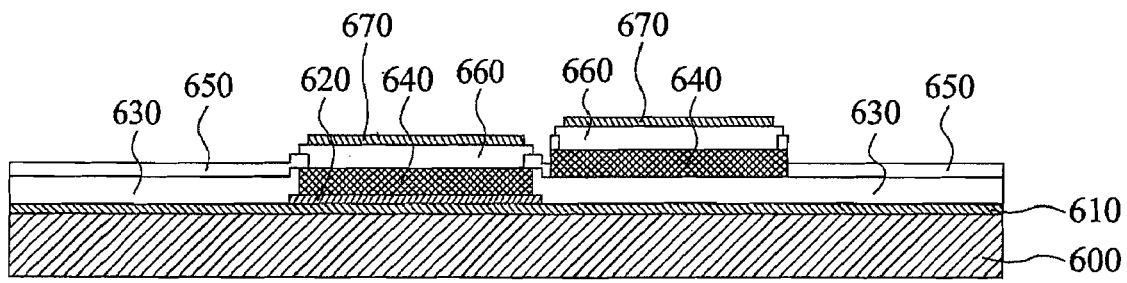

FIGS. 7A to 7G show the cross-sectional views of optical modulator 100 through line A to A' shown in FIG. 5 and described in FIGS. 6A and 6B during the fabrication process 200. FIG. 7A shows the cross-sectional view following step 210 of FIG. 6A. FIG. 7B shows the cross-sectional view following step 220 of FIG. 6A. FIG. 7C shows the cross-sectional view following step 230 of FIG. 6A. FIG. 7D shows the cross-sectional view following step 240 of FIG. 6A. FIG. 7E shows the cross-sectional view following step 250 of FIG. 6A. FIG. 7F shows the cross-sectional view following step 260 of FIG. 6A. FIG. 7G shows the cross-sectional view following step 270 of FIG. 6B.

Figure 8:
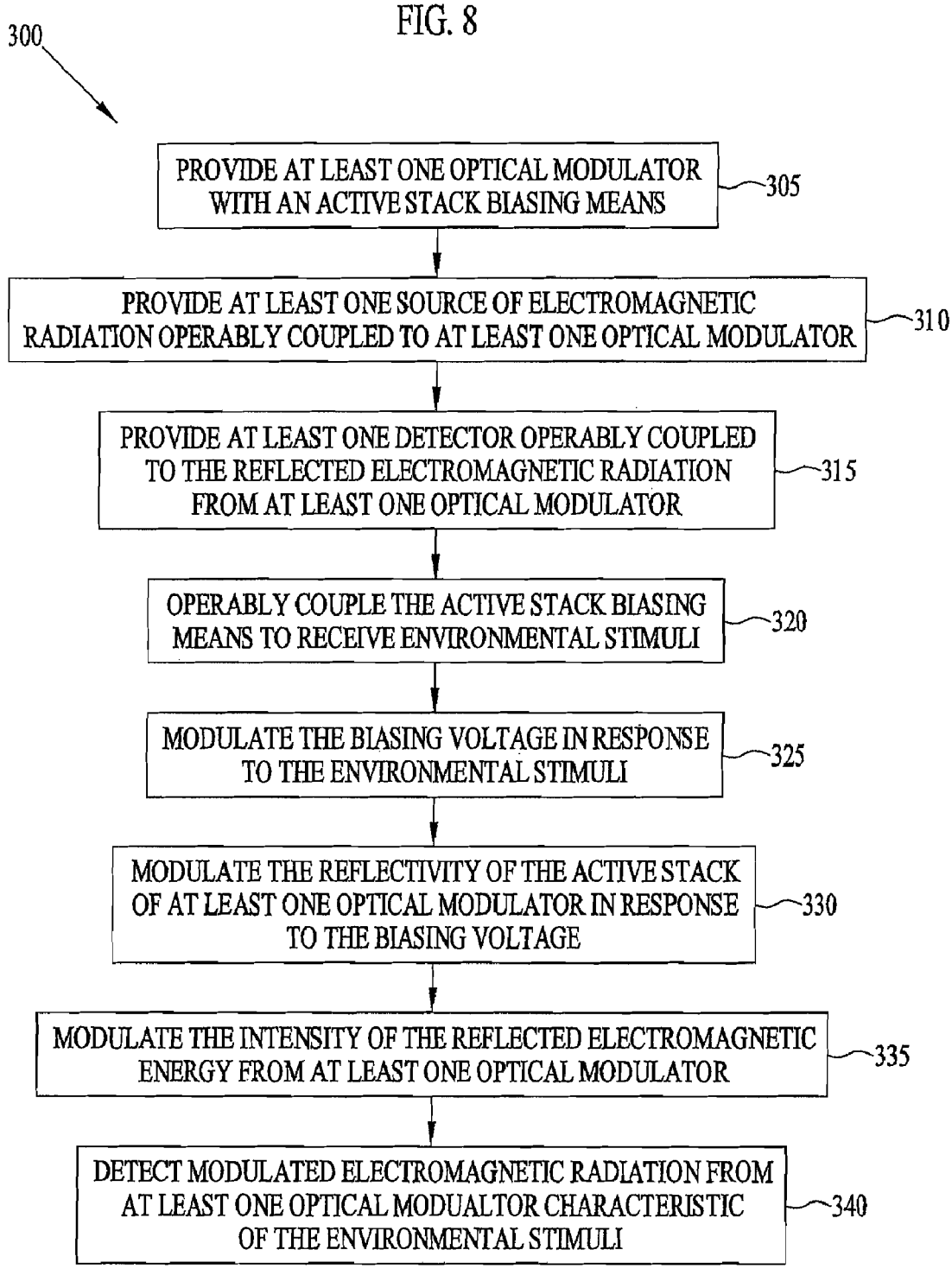
FIG. 8 provides a schematic description of the deployment and use of the optical modulator of FIG. 3.

FIG. 8 schematically describes the deployment and use of the optical modulator system 300 configured in FIG. 3. The steps include: step 305, providing at least one optical modulator with an active stack biasing means; step 310, providing at least one source of electromagnetic radiation operatively coupled to at least one optical modulator; step 315, providing at least one detector operatively coupled to the reflected electromagnetic radiation from at least one optical modulator; step 320, operatively coupling the active layer or stack biasing means to receive environmental stimuli; step 325, modulating the biasing voltage in response to the environmental stimuli; step 330, modulating the reflectivity of the active layer or stack of at least one optical modulator in response to the biasing voltage; step 335, modulating the intensity of the reflected electromagnetic energy from at least one optical modulator; and step 340, detecting the modulated electromagnetic energy from at least one optical modulator characteristic of the environmental stimuli.

Figure 9:
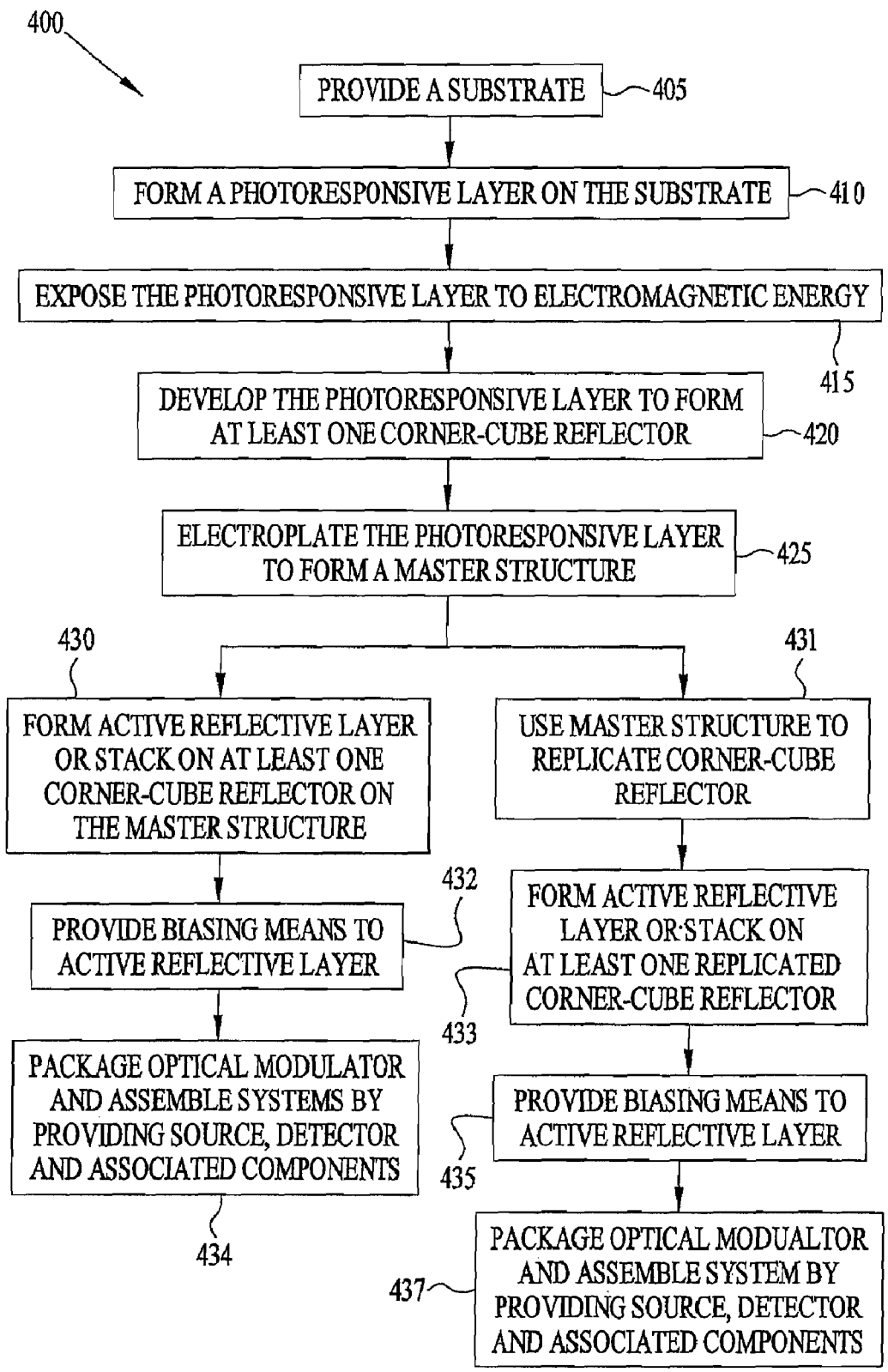
FIG. 9 provides another schematic description of the fabrication process of the optical modulator using the LIGA process.

FIG. 9 schematically describes another embodiment for the fabrication process of the micro-corner cube optical modulator. In this embodiment, rather than exclusively using surface micro-machining processes as used in MEMS technology, the LIGA process is used. LIGA is a German acronym for X-ray lithography, electrodeposition, and molding. X-rays are used to deeply illuminate a thick photoresponsive material, such as photoresist. Following development and removal of undesired portions of the photoresist, the patterns are then electroplated to form the desired structure. Furthermore, the resulting metallic structure can be used as a mold insert for precision plastic injection molding. Due to the nature of the X-ray photoresist, these structures can have heights ranging from microns to centimeters. As shown in FIG. 9, method 400 of making the optical modulator includes step 405, providing a substrate and step 410, forming a photoresponsive layer on the substrate. The substrate material is typically selected from silicon, quartz, glass, or Pyrex™ (Corning 7740) glass. The photoresponsive layer is typically a photoresist material sensitive to X-ray electromagnetic energy such as polymethyl methacrylate (PMMA). The photoresist layer can readily be formed up to about 550 μm, therefore corner cube reflectors of substantial dimensions can be accommodated. If desired, additional process steps (not shown) may be included to improve adhesion of the photoresponsive layer, to act as a seed layer for subsequent electrodeposition, or to form multiple layers. Such steps may include deposition (by electron-beam evaporation) of about 0.1 μm of titanium, deposition (by electron-beam evaporation) of about 0.1 μm of gold, deposition (by sputtering) of about 0.3 μm of titanium, and performing an isotropic wet etch to a depth of about 100 nm using a NaOH:$H_2O_2$ solution. Variations to these process details within the scope of these general teachings may be employed for the particular application. The method 400 of making the optical modulator further includes step 415, exposing the photoresponsive layer to electromagnetic energy, such as X-rays, and step 420, developing the photoresponsive layer to form at least one corner cube reflector. The development process is well known in the art of photoresponsive materials by which exposed regions (whose polymers become cross-linked by the electromagnetic energy) are selectively removed (if a "positive" resist) or retained (if a "negative" resist). Prior to step 425, electroplating the photoresponsive layer to form a master structure, the developed photoresponsive material may be further prepared by plasma cleaning in an ionized $O_2$—$CF_4$ atmosphere and isotropic wet etching the titanium as noted above. The electroplating process 425, well known in the art, includes DC electrodeposition of nickel to thicknesses of up to about 500 μm on the underlying metallic seed layer. As previously noted, multiple layers may be formed as desired, and dry-etching or "lift-off" techniques commonly practiced in the art of microfabrication may be used to pattern the electrodeposited layer if desired. In one preferred embodiment of method 400, an active reflective layer or stack is formed on at least one corner cube reflector on the master structure in step 430, in accordance with the earlier described techniques. Then a biasing means is provided to the active reflective layer in step 432, and the optical modulator is packaged into a system by providing a source, detector, and associated components in step 434 as previously described. In another embodiment of method 400, the master structure is used to replicate the corner cube reflector in step 431. This can be done by multiple electrodepositions and release of the electrodeposition layer or by mechanically printing into a subsequent compliant material. In either case, the master substructure is employed as a mold to create replicated corner cube reflectors. An active reflective layer or stack is formed on at least one corner cube reflector on the replicated corner cube reflectors in step 433, in accordance with the earlier described techniques. Then a biasing means is provided to the active reflective layer in step 435, and the optical modulator is packaged into a system by providing a source, detector, and associated components in step 437 as previously described.

Figure 10:
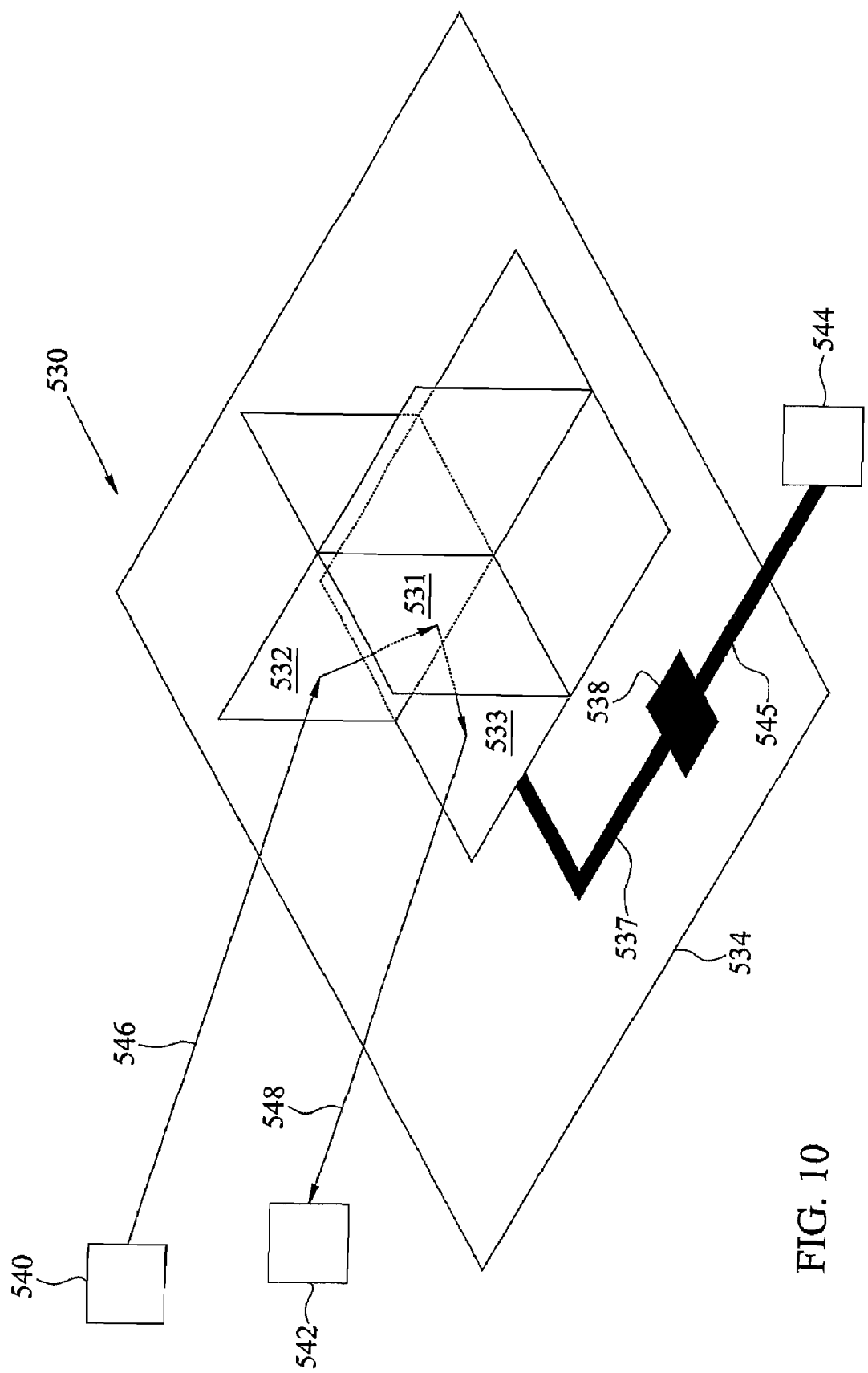
FIG. 10 provides a schematic description of the optical modulator fabricated using the LIGA process.

FIG. 10 schematically shows another embodiment for the optical modulator 530 fabricated using the LIGA process. Optical modulator 530 comprises three substantially planar reflective components 531, 532, and 533 arranged so that they are substantially mutually orthogonal to each other. In this embodiment, there is a plurality of substantially orthogonal planes formed. Base reflector 533 lies substantially in the plane of substrate 534. Unlike the previously described embodiments, side reflectors 531 and 532 are fabricated out of the plane of substrate 534 using the LIGA process described in FIG. 9. A beam of incident electromagnetic energy 546 from source 540 is depicted reflecting from optical modulator 530 following reflection off each of the three substantially planar reflective components 531, 532, and 533. Reflected beam of modulated electromagnetic energy 548 is depicted as returning in the direction of source 540 and collected by detector 542. Optical modulator 530 also comprises at least one electrically conductive pad 538 and at least one electrically conductive trace 537 operatively connected to at least one base reflector 533 by which a voltage may be applied to base reflector 533. Base reflector 533 contains at least one layer by which its reflection properties may be altered or modulated with an applied voltage, thereby modulating electromagnetic energy 546. Biasing source 544 may be operatively coupled by a suitable means 545 to provide a modulated voltage to electrically conductive pad 538. In one embodiment, biasing source 544 is a sensor thereby providing a modulated signal at detector 542, representative of the sensor output and its environmental characteristics. The operable coupling of a plurality of biasing sources (or sensors) to a plurality of corner cube reflectors is not shown for simplicity.

The optical modulator as described herein may include monolithically integrated components to self-assemble the corner cube following fabrication. Examples include scratch drive actuators using microelectromechanical structures as practiced in the art of microassembly. Similarly, piezoelectric transducers as practiced in the art could be integrated to self-assemble the corner cube following fabrication. Other materials, biasing sources, and layers can be used in the optical modulator, but the simplest embodiments were described to convey the operational concept. For example, the reflective components 31, 32, and 33 of FIG. 3 may use aluminum, gold, silver or metallic alloys or multi-layers or dielectric reflective layers to optimize reflection based on the wavelengths desired for operation and anticipated incident angles. Also, more than one reflector may be biased to modulate the reflected electromagnetic intensity. Finally, a variety of sensors may be employed, either identical or different, in a system configuration and operatively coupled to the optical modulator.

Described herein is a method for making the new optical modulator, a system incorporating the new optical modulator, and a method for using the new optical modulator. The optical modulator uses a corner cube concept to redirect the optical energy back in the direction of the source of the light, and can therefore be interrogated by a remote source. Coupling of the corner cube reflector of the optical modulator to a sensor enables a very low power method of transmitting information from the sensor to a remote source. An advantage of the optical modulator described herein is the elimination of moving parts associated with the prior art. Moving parts cause problems associated with release etches during fabrication, and reliability of the miniature membranes due to stiction and mechanical stresses. These latter problems in reality are daunting, and have only partially been overcome using expensive hermetic packaging technologies.

Clearly, many modifications and variations of the optical modulator are possible in light of the above teachings. It is therefore to be understood that within the scope of the appended claims, the optical modulator may be practiced otherwise than as specifically described.

We claim:

1. A method of fabricating an optical modulator, comprising the steps of:
   providing a silicon substrate;
   forming a silicon nitride layer on the silicon substrate;
   forming a first polycrystalline silicon layer on the silicon nitride layer;
   patterning the first polycrystalline silicon layer;
   forming a first silicon dioxide layer on the first patterned polycrystalline silicon layer;
   patterning the first silicon dioxide layer;
   forming a second polycrystalline silicon layer on the first patterned silicon dioxide layer;
   patterning the second polycrystalline silicon layer;
   forming a second silicon dioxide layer on the second patterned polycrystalline silicon layer;
   patterning the second silicon dioxide layer;
   forming a third polycrystalline silicon layer on the second patterned silicon dioxide layer;
   patterning the third polycrystalline silicon layer;
   forming a metal layer on the third patterned polycrystalline silicon layer;
   patterning the metal layer;
   removing the first and second silicon dioxide layers to effect release of first and second side reflectors;
   forming an active layer on the metal layer; and
   patterning the active layer or stack to form a base reflector and associated conductive traces for biasing.

2. The method of claim 1 further comprising the steps of:
   positioning the first and second side reflectors substantially orthogonal to each other and the base reflector;
   operatively coupling a biasing means to the base reflector.

3. The method of claim 2 wherein the biasing means comprises a microsensor.

4. The method of claim 3 wherein the microsensor is selected from the group consisting of chemical sensors, biological sensors, vibration sensors, radiological sensors, temperature sensors, photonic sensors, acoustic sensors, magnetic sensors, electromagnetic sensors, ionization sensors, humidity sensors, and pH sensors.

5. The method of fabricating an optical modulator system claim 1 further comprising the step of fabricating an optical modulator system by:
   providing at least one optical modulator as fabricated in claim 1;
   providing an active layer or stack biasing means to the at least one optical modulator;
   operatively coupling at least one source of electromagnetic radiation to the at least one optical modulator;
   providing at least one detector operatively coupled to the reflected electromagnetic radiation from at least one optical modulator;
   operatively coupling the active layer or stack biasing means to receive environmental stimuli;
   modulating a biasing voltage in response to the environmental stimuli;
   modulating the reflectivity of the active layer or stack of at least one optical modulator in response to the biasing voltage;
   modulating the intensity of the reflected electromagnetic energy from at least one optical modulator; and
   detecting the modulated electromagnetic radiation from at least one optical modulator characteristic of the environmental stimuli.

6. The method of claim 1 wherein the step of forming a first polycrystalline silicon layer on the silicon nitride layer is accomplished by decomposition of silane at an elevated temperature.

7. The method of claim 6 wherein the first silicon dioxide layer, the second polycrystalline silicon layer, the second silicon dioxide layer, the third polycrystalline silicon layer, and the metal layer are formed by deposition.

8. The method of claim 7 wherein:
   the first polycrystalline silicon layer is approximately 0.5 µm thick;
   the first silicon dioxide layer is approximately 2.0 µm thick;
   the second polycrystalline silicon layer is approximately 2.0 µm thick;
   the second silicon dioxide layer is approximately 0.75 µm thick;
   the third polycrystalline silicon layer is approximately 1.5 µm thick; and
   the metal layer is approximately 0.5 µm thick.

9. The method of claim 8 wherein the metal layer is approximately a 99% aluminum and 1% silicon alloy.

10. The method of claim 1 wherein the step of removing the first and second silicon dioxide layers to effect release of first and second side reflectors comprises using a buffered hydrofluoric acid solution with subsequent $CO_2$ drying.

11. The method of claim 10 wherein the step of forming the active layer on the metal layer comprises the step of depositing an ion storage layer, an ion conductive layer, and an electrochromic material on the metal layer.

12. The method of claim 1 further comprising the step of positioning the released side reflectors substantially orthogonal to themselves and the base reflector.

13. The method of claim 12 wherein the released side reflector positioning step comprises:
    rotating a first side reflector on hinges about an axis formed by a common edge between the base reflector and the first side reflector; and
    securing the first side reflector in an orthogonal position with respect to the base reflector.

14. The method of claim 13 wherein the released side reflector positioning step further comprises:
    rotating a second side reflector on hinges about an axis formed by a common edge between the base reflector and the second side reflector;
    securing the second side reflector in an orthogonal position with respect to the base reflector and the first side reflector thus forming a corner cube reflector.

15. The method of claim 14 further comprising:
providing a source of electromagnetic energy;
providing a detector for the reflected energy; and
providing associated optical, electrical, and power sources to enable operation.

16. The method of claim 14, further comprising:
operatively coupling at least one source of electromagnetic radiation to the corner cube reflector;
providing at least one detector operatively coupled to the reflected electromagnetic radiation from the corner cube reflector;
operatively coupling the active layer or stack biasing means to receive environmental stimuli;
modulating a biasing voltage in response to the environmental stimuli;
modulating the reflectivity of the active layer or stack of at least one optical modulator in response to the biasing voltage;
modulating the intensity of the reflected electromagnetic energy from the corner cube reflector; and
detecting the modulated electromagnetic radiation from the corner cube reflector characteristic of the environmental stimuli.

\* \* \* \* \*